United States Patent
Bar-Ness et al.

(10) Patent No.: US 7,376,202 B2
(45) Date of Patent: May 20, 2008

(54) OFDM PEAK-TO-AVERAGE POWER RATIO REDUCTION BY COMBINED SYMBOL ROTATION AND INVERSION WITH LIMITED COMPLEXITY

(75) Inventors: Yeheskel Bar-Ness, Marlboro, NJ (US); Mizhou Tan, Whitehall, PA (US)

(73) Assignee: New Jersey Institute of Technology, Newark, NJ (US)

( * ) Notice: Subject to any disclaimer, the term of this patent is extended or adjusted under 35 U.S.C. 154(b) by 609 days.

(21) Appl. No.: 10/989,895

(22) Filed: Nov. 16, 2004

(65) Prior Publication Data
US 2006/0104373 A1    May 18, 2006

Related U.S. Application Data

(60) Provisional application No. 60/627,678, filed on Nov. 12, 2004.

(51) Int. Cl.
*H04K 1/02* (2006.01)

(52) U.S. Cl. ............................... 375/296; 370/208

(58) Field of Classification Search ............... 375/296, 375/346, 284, 242, 285; 370/208, 210
See application file for complete search history.

(56) References Cited

U.S. PATENT DOCUMENTS

2004/0190640 A1*  9/2004  Dubuc et al. ............... 375/260

* cited by examiner

*Primary Examiner*—Khai Tran
(74) *Attorney, Agent, or Firm*—Connolly Bove Lodge & Hutz LLP

(57) ABSTRACT

A signal scrambling method based on combined symbol rotation and inversion (CSRI) for the peak-to-average power ratio (PAPR) reduction of OFDM signals. By dividing OFDM sequences into subblocks and performing symbol rotation and inversion in each subblock, high degrees of freedom are available to offset the possibility of encounting poor sequences with large PAPR. In order to reduce the complexity of this scheme, two suboptimal CSRI schemes are disclosed, one based on a successive approach combined with symbol grouping, and the other based on a random approach combined with threshold control.

5 Claims, 8 Drawing Sheets

OFDM PEAK-TO-AVERAGE POWER RATIO REDUCTION BY COMBINED SYMBOL ROTATION AND INVERSION WITH LIMITED COMPLEXITY

RELATED APPLICATION

This application claims priority from U.S. Provisional Application Ser. No. 60/627,628, filed Nov. 12, 2004.

GOVERNMENT LICENSE RIGHTS

The United States government may hold license and/or other rights in this invention as a result of financial support provided by governmental agencies in the development of aspects of the invention.

FIELD OF INVENTION

This invention relates generally to high rate wireless data communication, and more specifically relates to a signal scrambling method based on combined symbol rotation and inversion (CSRI) for the peak-to-average power ratio (PAPR) reduction of OFDM signals.

BACKGROUND OF INVENTION

Due to its robustness to multipath fading and high spectral utilization efficiency, Orthogonal Frequency Division Multiplexing (OFDM) is a very attractive technique for high rate wireless data communications [J. A. C. Bingham, "Multicarrier modulation for data transmission: An idea whose time has come", IEEE Commun. Mag., vol. 28, pp. 5-14, May 1990], [Y. Wu and W. Y. Zou, "COFDM: an overview", IEEE Trans. On Broadcasting, vol. 41, pp. 1-8, March 1995]. It has been adopted for many applications such as Digital Audio Broadcasting (DAB), Digital Video Broadcasting (DVB) and wireless Local Area Networks (LANs). However, its main disadvantage is the exhibiting of a prohibitively large peak-to-average power ratio (PAPR), which results in significant in-band distortion and spectral spreading when passed through a nonlinear device such as a transmitter power amplifier [A. R .S. Baiha, M. Singh, A. J. Goldsmith, and B. R. Saltzberg, "A new approach for evaluating clipping distortion in multicarrier systems," IEEE J. Select Areas Commun, vol. 20, no. 5 pp., pp. 1037-1046, June 2002]. Without the use of any PAPR reduction technique, the efficiency of power consumption at the transmitter becomes very poor.

Different schemes have been proposed to mitigate PAPR problem. These are mainly classified into two categories: signal distortion and signal scrambling. With signal distortion techniques, OFDM signals are deliberately distorted prior to amplification. Among these, envelope clipping is the simplest. However, clipping introduces both in-band and out-band radiation [H. Ochiai and H. Imai, "Performance analysis of deliberately clipped OFDM signals," IEEE Trans. On Commun., vol. 50, no. 1, pp 89-101, January 2002]. Although applying powerful coding schemes (e.g., near optimal turbo codes) can alleviate this problem, a performance loss is inevitable. With signal scrambling techniques, OFDM signals are modified distortionlessly to present better PAPR property. However, to recover the original OFDM signals correctly, side information should be provided, which might reduce data efficiency. Among many signal scrambling methods, the partial transmit sequence (PTS) scheme has been extensively studied due to its high performance and relatively low implementation cost [S. H. Muller and J. B. Huber, "OFDM with reduced peak-to-average power ratio by optimum combination of partial transmit sequence", Electronic Lett., vol 33, no. 5, pp. 368-369, Febuary 1997]. In this scheme, OFDM sequences are partitioned into subblocks, and each subblock is multiplied by a phase weighting factor to produce alternative sequences with low PAPR. To reduce the complexity of exhaustive searches for best phase weighting factors, several suboptimal schemes were proposed [L. J. Cimini Jr. and N. R. Sollenberger, "Peak-to-average power ratio by optimum combination of partial transmit sequences", IEEE Commun. Lett., vol 4, no. 3, pp 86-88, March 2000], [C. Tellambura, "Improved phase factors computation for the PAR reduction of an OFDM signal using PTS", IEEE Commun. Lett., vol. 5, no. 4, pp. 135-137, April 2001]. It was shown in Cimini that an additional PAPR reduction by increasing the number of phase weighting factors (greater than 4) is negligible. As a matter of fact, a larger number of phase weighting factors increases the hardware complexity significantly and makes the whole system vulnerable to the effect of phase noise.

In this invention, a signal scrambling method based on combined symbol rotation and inversion (CSRI) is disclosed for PAPR reduction of OFDM signals. It was found in [M. Tan, J. Cheng, and Y. Bar-Ness, "OFDM peak power reduction by a novel coding scheme with threshold control," Proc. IEEE VTC, vol. 2, pp. 669-672, October 2001] that by performing symbol rotation, high degrees of freedom are available to offset the possibility of encountering poor sequences with large PAPR. There, BPSK modulated OFDM blocks were encoded by odd parity checking codes of rate ¾, which could prevent producing a string of same bits. For a coded OFDM block of length N, performing bit rotation in each subblock, termed redundant bit position rotation (RBPR) where instead of putting redundant bit at the end of each subblock, by performing bit rotation, redundant bit is put at different positions in each subblock, $4^{N/4}$ different scrambled sequences can be produced and the one with the smallest PAPR is selected for transmission. The effectiveness of this scheme was exhibited by simulations. However, its complexity, which is exponentially increased with the subcarrier number, makes it unsuitable for practical application. By investigating the characteristic of PAPR distribution, a threshold control method was added in M. Tan, Cheng and Y. Bar-Ness, Op. Cit., which significantly reduced the complexity for finding the best sequence. Nevertheless, with a large number of subcarriers and small value of PAPR threshold, number of comparisons needed is still quite large. Therefore, suboptimal schemes are needed to further reduce complexity.

SUMMARY OF INVENTION

In the present invention, we extend the work in M. Tan, Cheng and Y. Bar-Ness, Op. Cit., to general OFDM signals, which means no constraints on constellation size and coding scheme, and in particular, to avoid the possibility of having string of same symbols in one OFDM block, which causes large PAPR. Symbol inversion, (a phase change of π) is added to the symbol rotation. Hence, we term this new method, "combined symbol rotation and inversion" (CSRI). Two suboptimal CSRI schemes, one based on a successive approach combined with symbol grouping, termed "successive suboptimal CSRI" (SS-CSRI) and another based on a random approach combined with threshold control, termed "random suboptimal CSRI" (RS-CSRI) are also disclosed. With these suboptimal schemes, the complexity can be reduced significantly with only slight performance degradation. Simulation results show that in comparison to a similar suboptimal partial transmit sequence (PTS) scheme, both SS-CSRI and RS-CSRI schemes can achieve better performance. This implies that performing symbol rotation is more effective for PAPR reduction than increasing the number of phase weighting factors.

Figure 6:
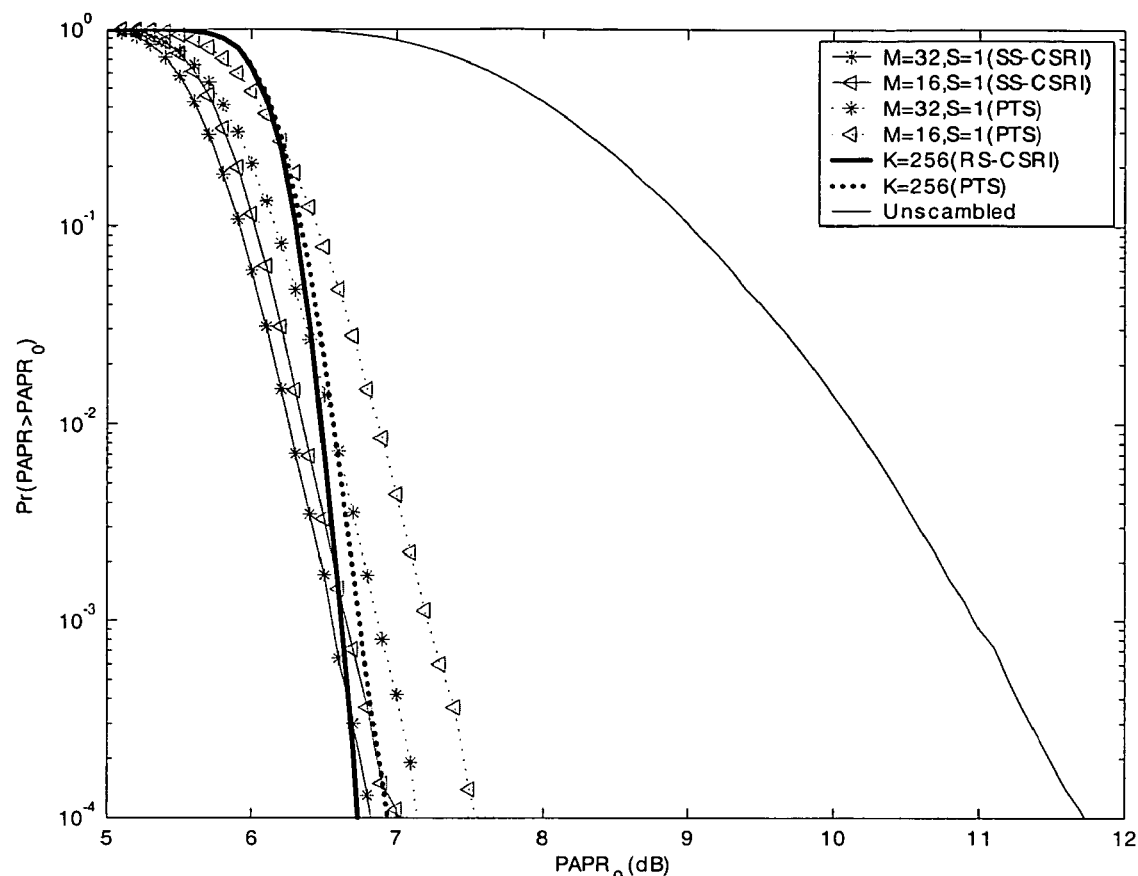

The simulation results with K=256, M=32, N=128 are given in FIG. 6.

Figure 7:
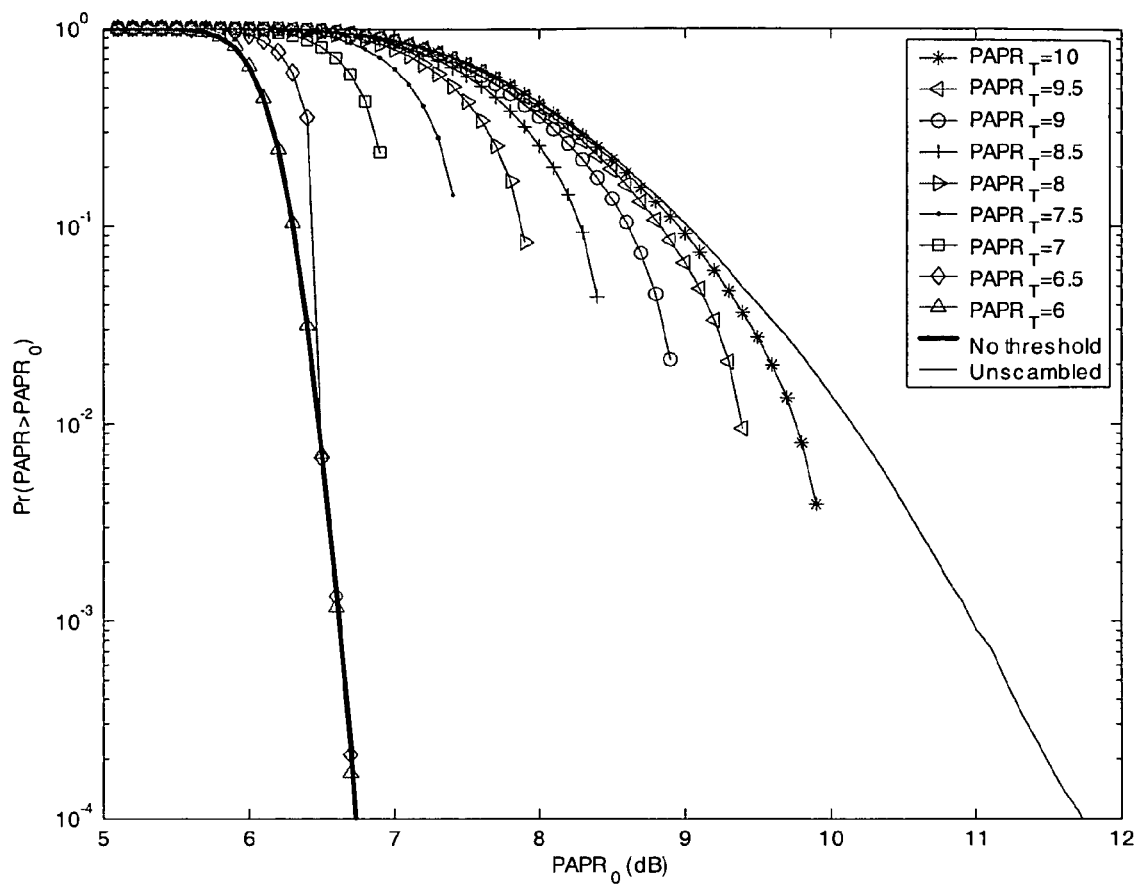

FIG. 7 shows The CCDFs of RS-CSRI scheme with different $PAPR_T$; and

Figure 8:
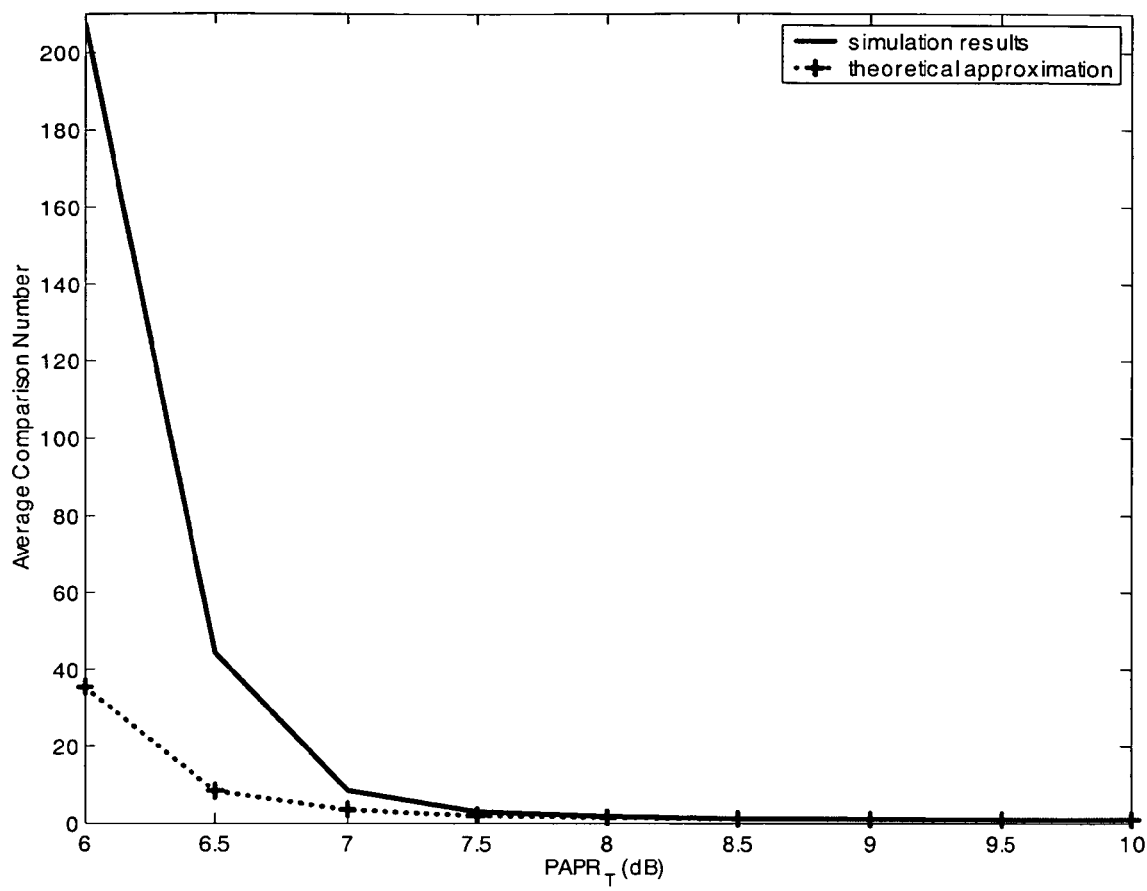

FIG. 8 shows the average number of comparisons needed versus selected $PAPR_T$.

DESCRIPTION OF PREFERRED EMBODIMENTS

PAPR Analysis of OFDM Signals

In OFDM, each block of N symbols, $\{X_n, n=0, 1, \ldots, N-1\}$, will modulate a subcarrier of an orthogonal set whose frequency is $\{f_n, n=0, 1, \ldots, N-1\}$, with $f_n=n\Delta f$, where $\Delta f=1/NT$ and T is the original symbol period. The resulting baseband OFDM signal x(t) of a block can be expressed as $$x(t) = \sum_{n=0}^{N-1} X_n e^{j(2\pi f_n t + \beta_n)}, \quad 0 \leq t \leq NT \quad (1)$$

where $\beta_n$ is the initial phase of the $n^{th}$ subcarrier, which for simplicity is assumed to be zero.

The PAPR of the transmitted signal in equation (1) is defined by, $$PAPR = \frac{P_{PEAK}}{P_{AVG}} \quad (2)$$

with $$P_{PEAK} = \max\{|x(t)|^2\}_{t \in [0, NT]} \quad (3)$$

and

-continued $$P_{AVG} = E[|x(t)|^2] \quad (4)$$
$$= \frac{1}{NT} \int_0^{NT} |x(t)|^2 dt$$

With N subcarriers each having normalized symbol energy, the average power $P_{AVG}=N$.

Since most systems employ discrete-time signals, instead of reducing the continuous-time peak, i.e., max|x(t)|, the maximum amplitude of LN samples (where L is the oversampling factor) of x(t) is reduced. The case L=1 is known as critical sampling or Nyquist rate sampling, while L>1 corresponds to oversampling. It is well known that Nyquist sampling will miss some of the signal peaks and give optimistic results for PAPR. It has been pointed out in [C. Tellambura "Computation of the continuous-time PAR of an OFDM signal with BPSK subcarriers," *IEEE Commun. Lett.* Vol. 5, pp. 185-187, May 2001] that oversampling factor L=4 is sufficient for capturing the continuous-time peaks. Oversampling factor of L=4 is chosen for all simulations in this specification. Oversampling can be implemented by padding (L−1)N zeros on original OFDM blocks and then applying an inverse Fast Fourier transform (IFFT). Therefore, the peak power can be expressed as $$P_{PEAK} = \max_{1 \leq j \leq LN-1} \left[|IFFT(\overline{X})|_j^2\right] \quad (5)$$

with $$\overline{X} = \left[X_0, X_1, \ldots, X_{N-1}, \underbrace{0, 0, \ldots, 0}_{(L-1)N \text{ zeros}}\right] \quad (6)$$

The complementary cumulative distribution function (CCDF) of the PAPR is defined as $$CCDF = Pr(PAPR > PAPR_0) \quad (7)$$

Figure 1:
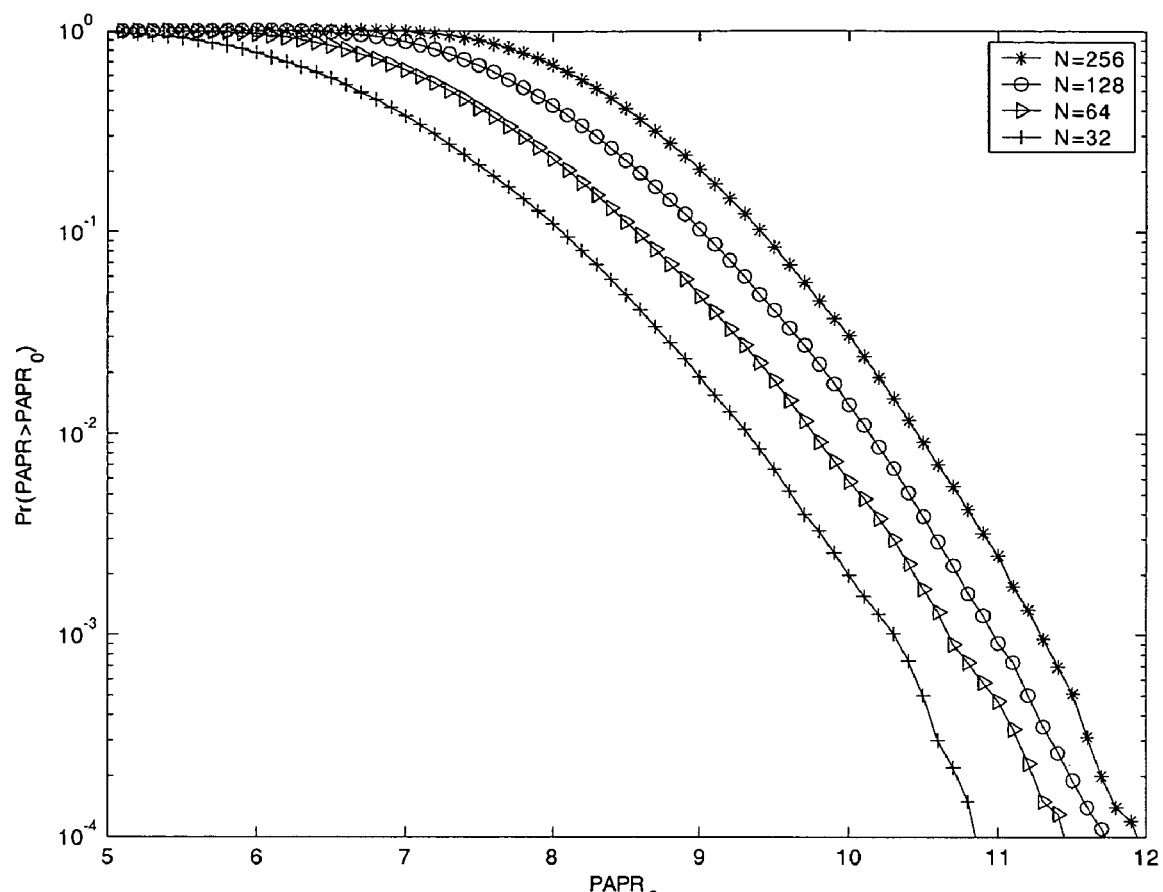
FIG. 1 The CCDF of QPSK modulated OFDM signals with different number of subcarriers is shown in FIG. 1.

The CCDF of QPSK modulated OFDM signals with different number of subcarriers is shown in FIG. 1. From this figure, it can be easily seen that even with 256 sub-carriers, whose absolute PAPR is 24 dB (PSK modulation), the PAPR exceeds 12 dB for only 0.01% of the possible transmitted OFDM signals. This is because, with a large number of subcarriers, the signal amplitude can be approximated as Rayleigh distributed, thus the large peaks happen only with a very small probability. Therefore, the absolute PAPR may not be meaningful for characterizing the PAPR property of OFDM signals, instead, the statistical distribution of PAPR should be taken into account [H. Ochiai and H. Imai, "On the distribution of the peak-to-average power ratio in OFDM signals," *IEEE Trans. on Commun.*, vol. 49, no. 2, pp. 282-289, Febuary 2001]. However, without the use of any PAPR reduction technique, quite large PAPR (more than 7.4 dB) will happen almost with probability 1 when N=256.

Optimal Combined Symbol Rotation and Inversion (O-CSRI) Scheme

From equations (1) to (4), it is clear that the PAPR is entirely dependent on the transmit symbols $X_n$, ($0 \leq n \leq N-1$). Therefore, permuting $X_n$ can provide the possibility of producing good sequences with small PAPR. In the O-CSRI scheme, OFDM sequence of length N is divided into M subblocks, thus, each subblock contains N/M symbols. The $i^{th}$ subblock $$B_i = \left[ X_{i,1}, X_{i,2}, \ldots, X_{i,\frac{N}{M}} \right],$$

by performing symbol rotation, at most N/M different subblocks can be produced (it is possible that some subblocks produced by different permutations might be the same) which are $$\tilde{B}_i^{(1)} = \left[ X_{i,1}, X_{i,2}, \ldots, X_{i,\frac{N}{M}} \right],$$

$$\tilde{B}_i^{(2)} = \left[ X_{i,\frac{N}{M}}, X_{i,1}, \ldots, X_{i,\frac{N}{M}-1} \right], \ldots, \tilde{B}_i^{\left(\frac{N}{M}\right)} = [X_{i,2}, X_{i,3}, \ldots, X_{i,1}].$$

To avoid having the same symbols occur in one OFDM block, besides symbol rotation, another N/M subblocks $\tilde{\underline{B}}_i^{(j)}$ are produced by inverting $\tilde{B}_i^{(j)}$, i.e., $\tilde{\underline{B}}_i^{(j)} = -\tilde{B}_i^{(j)}$ (i=1,2,..., M; j=1,2,..., N/M). By combining $\tilde{B}_i^{(j)}$ and $\tilde{\underline{B}}_i^{(j)}$, 2N/M blocks are obtained for each original subblock. With M subblocks, at most, $$\left( \frac{2N}{M} \right)^M$$

different OFDM sequences are produced from the original sequence and the one with the smallest PAPR is selected for transmission. To recover the original OFDM sequence, $$M \cdot \log_2 \left( \frac{2N}{M} \right)$$

bits are needed for providing the side information. For Q-ary modulated OFDM symbols, the data efficiency can be expressed as $$\varepsilon = 1 - \frac{M \cdot \log_2 \left( \frac{2N}{M} \right)}{N \cdot \log_2(Q)} \quad (8)$$

With this scheme, high degrees of freedom are available to offset the possibility of encountering poor sequences. However, it is obvious that the complexity is increased exponentially with N, if assuming the number of symbols in each subblock is constant. For example, with $$N = 128 \text{ and } M = 32, \, 8^{32} \left( \left( \frac{2N}{M} \right)^M \right)$$

comparisons are needed for finding the best sequence, making complexity prohibitively high.

Figure 2:
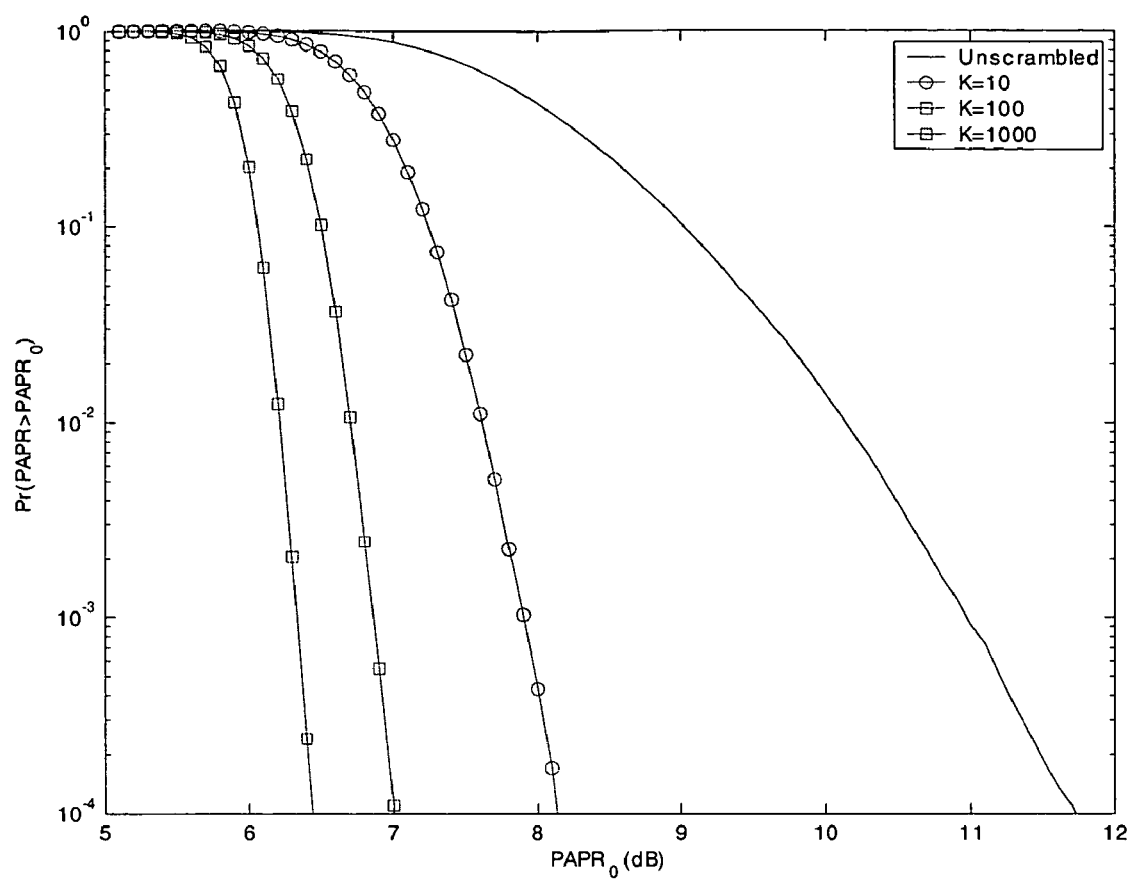
FIG. 2 depicts the CCDF results for QPSK modulated OFDM signals with 128 subcarriers when using K=10, 100 and 1000 random permutations out of $$\left(\frac{2N}{M}\right)^M.$$

FIG. 2 depicts the CCDF results for QPSK modulated OFDM signals with 128 subcarriers when using K=10, 100 and 1000 random permutations out of $$\left( \frac{2N}{M} \right)^M.$$

From the simulation results, it is clear that larger number of permutations can provide better PAPR performance. However, even with rather small number of permutations such as K=100, we obtain 4.7 dB reduction of $10^{-4}$ PAPR, but further increasing the number of permutations can not improve the performance significantly. Using 1000 permutations, the performance improvement over 100 permutations is less than 1 dB.

However, since all permutations are chosen randomly, there is no way of knowing when the best sequence will take place until all K comparisons are made, which might be inefficient in practice. Nevertheless, the threshold control scheme proposed in Tan, Cheng and Bar-Ness, Op. Cit., is suitable to apply for reducing complexity. However, with a large number of subcarriers and small value of PAPR threshold, a large number of comparisons is still needed for finding the good sequence.

The good performance with small number of permutations shown in FIG. 2 motivates considering suboptimal schemes to further reduce the complexity.

Suboptimal Combined Symbol Rotation and Inversion (S-CSRI) Scheme

Successive Suboptimal CSRI (SS-CSRI) Scheme with Symbol Grouping

In SS-CSRI scheme, a successive approach is used to achieve a good performance with a small number of permutations. Different from the O-CSRI scheme, with SS-CSRI, we do not combine different random permutations of all subblocks, instead, we do random permutations in each subblock at a time (keeping the other blocks unchanged) to find the one with smaller PAPR. By dividing the original OFDM sequence of length N into M subblocks, firstly, we perform symbol rotation and inversion on the first subblock only and compute the PAPR of all 2N/M modified sequences. We retain the one with the best PAPR. Next, we do the same for the second subblock and keep all the other blocks unchanged. Similarly we retain the one with the best PAPR. By continuing this way successively, the PAPR will be reduced gradually until finally we permute the last subblock and get the smallest PAPR. The resulting sequence is selected for transmission. By using this suboptimal approach, the number of comparisons needed for finding the better sequence equals 2N. Hence the complexity is increased only linearly with the number of subcarriers. To further reduce the number of comparisons, a symbol grouping method is added to the SS-CSRI scheme, to reduce the number of rotations in each subblock. Let S be the symbol grouping level, which denotes the number of individual symbols in each group, then the number of symbol rotations in each subblock reduces to N/M·S. In fact with symbol grouping, the $i^{th}$ subblock $$B_i = \left[ X_{i,1}, X_{i,2}, \cdots, X_{i,\frac{N}{M}} \right]$$

is expressed as a set of symbol groups $$B_i = \left[ \underbrace{X_{i,1}, \ldots, X_{i,S}}_{1^{st} \text{group}}, \underbrace{X_{i,S+1}, \ldots X_{i,2S}}_{2^{nd} \text{group}}, \ldots, \underbrace{X_{i,\left(\frac{N}{M \cdot S}-1\right)S+1}, \ldots, X_{i,\frac{N}{M}}}_{\left(\frac{N}{M \cdot S}\right)^{th} \text{group}} \right] \quad (9)$$

then instead of performing rotations on individual block symbols, rotations are performed on individual groups. Therefore, combined with symbol inversion, at most 2N/M·S different permutations are produced, reducing the number of comparisons to 2N/S.

Figure 3:
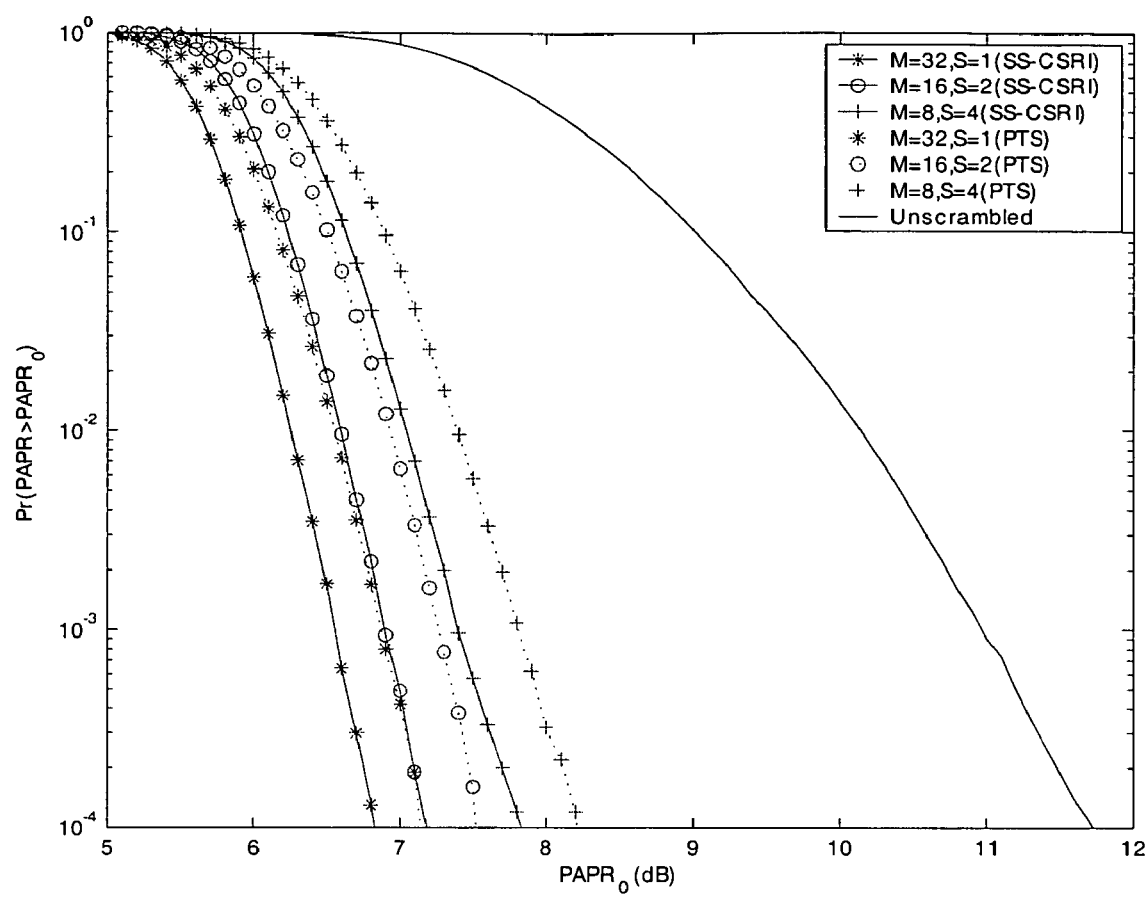
In FIG. 3, different number of subblocks are considered, in SS-CSRI scheme.
Figure 4:
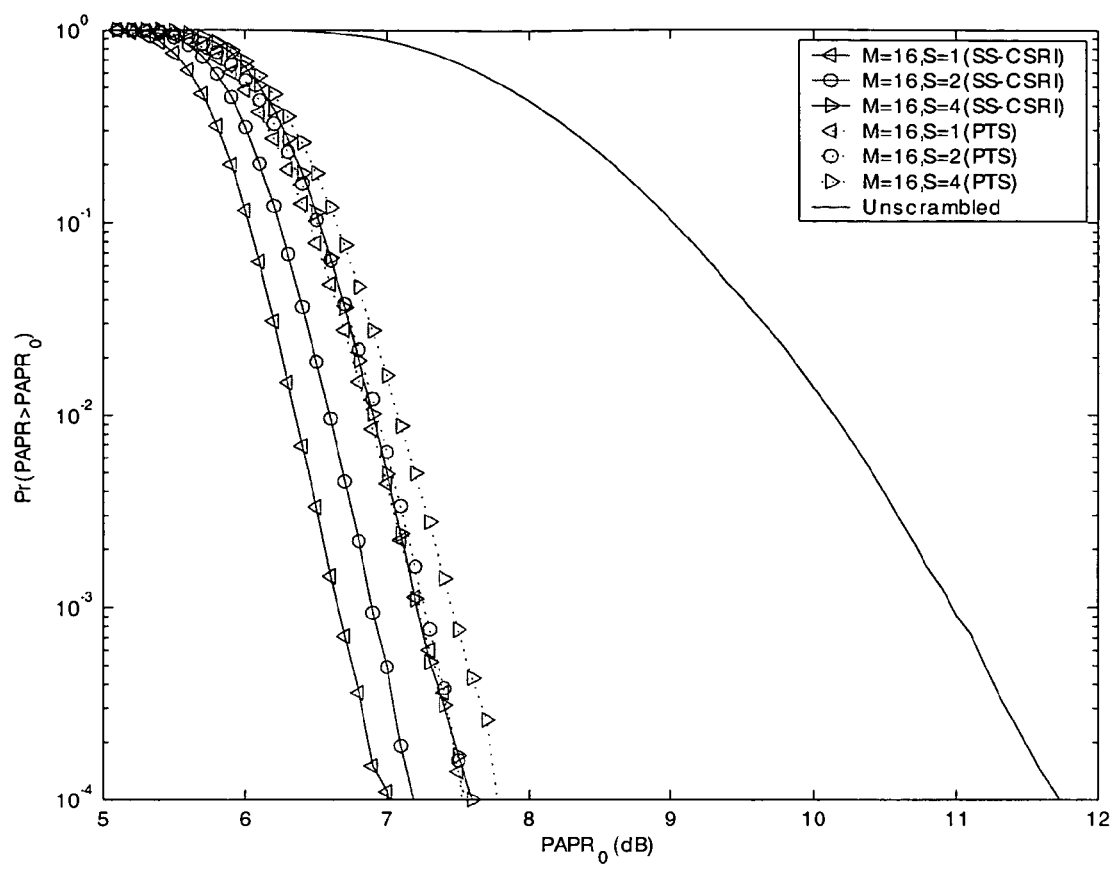
In FIG. 4, with 16 subblocks, different symbol grouping levels are considered.
Figure 5:
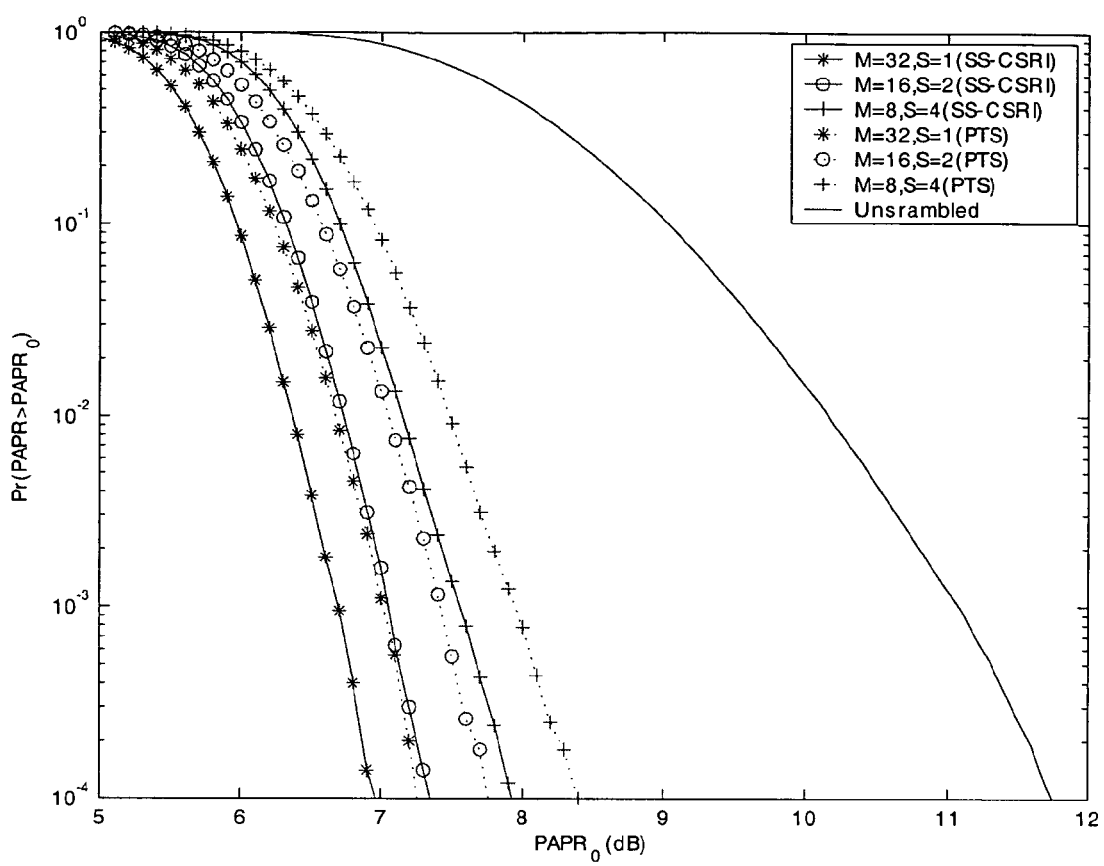
In FIG. 5, same scenarios as in FIG. 4 are simulated again for 16-QAM.

In examining the performance of SS-CSRI which follows; 128 subcarriers (N=128), 100,000 QPSK modulated OFDM blocks are generated to obtain the CCDFs. For comparison, the performance of similar PTS scheme is also added, in which the same successive approach is used [Cimini op. cit.]. That is instead of doing rotation and inversion, we multiply each subblock with a set of phase weighting factors, which are assumed uniformly distributed over [0, π]. For fair comparison, the number of permutations used is kept the same in both schemes. The effects of different parameters are studied and the results are shown in FIGS. 3, 4 and 5. In FIG. 3, different number of subblocks are considered, in SS-CSRI scheme, 8 permutations of symbol rotation and inversion is used in each subblock (Here, different grouping levels are used to control the number of permutations.) and in the suboptimal PTS scheme, 8 phase weighting factors multiplication is taken. From the simulation results depicted in this figure, it is clear that in SS-CSRI scheme, with 32 subblocks, the $10^{-4}$ PAPR can be reduced almost 5 dB, compared with the unscrambled OFDM signals. Furthermore, with the decrease of number of subblocks, the PAPR performance will only degrade slightly. Even with 8 subblocks, the $10^{-4}$ PAPR is reduced by about 4 dB. In all situations, SS-CSRI scheme achieves better performance than the similar PTS scheme. In FIG. 4, with 16 subblocks, different symbol grouping levels are considered. In PTS scheme, the number of different possible sequences is reduced by decreasing the phase weighting factors. Simulation results in this figure show that in SS-CSRI scheme, with S=1, the $10^{-4}$ PAPR can be reduced about 4.8 dB, compared with the unscrambled OFDM signals. And increasing the symbol grouping level, the performance loss is very small. For example, with S=4, the $10^{-4}$ PAPR can still be reduced more than 4 dB. Furthermore, in all situations, SS-CSRI scheme achieves better performance than the corresponding suboptimal PTS scheme. In fact, with the same number of subblocks, increasing the number of phase weighting factors from 4 to 8, the performance improvement is negligible. In FIG. 5, same scenarios as in FIG. 4 are simulated again for 16-QAM, which depicts easily that using a 16-QAM constellation to modulate each subcarrier results in negligible performance difference to that with the QPSK. This shows the robustness of this scheme for higher constellation size.

The better performance of the SS-CSRI scheme under various scenarios implies that performing symbol rotation can reduce the PAPR more effectively than increasing the phase weighting factors. Note that in the extreme case of $$S = \frac{N}{M},$$

with means no rotation is made, the CSRI scheme becomes the PTS scheme with two phase weighting factors 0 and π. Even in this case, rather good PAPR performance can still be ensured [Cimini Op. cit.].

Random Suboptimal CSRI (RS-CSRI) Scheme with Threshold Control

From FIG. 2, it is obvious that using a limited number of random permutations can also reduce the PAPR significantly. This results suggest another way of PAPR reduction which is based on a random approach. In this approach, we produce a dimension K×M matrix with random numbers, expressed as $$R = \begin{bmatrix} r_{1,1} & r_{1,2} & \cdots & r_{1,M} \\ r_{2,1} & r_{2,2} & \cdots & r_{2,M} \\ \vdots & \vdots & \ddots & \vdots \\ r_{K,1} & r_{K,2} & \cdots & r_{K,M} \end{bmatrix} \quad (10)$$

where K denotes the total number of permutations. Each item in this matrix is an integer random number uniformly distributed over $$\left[1, \frac{2N}{M \cdot S}\right],$$

representing 2N/M·S predefined different permutation operations. By performing permutations based on this randomly produced table on M subblocks, K different sequences can be produced and the one with the smallest PAPR is selected for transmission.

Of course, the receiver should have the knowledge of matrix R to correctly recover the original OFDM signals. Therefore, with this scheme, only $\log_2 K$ bits are needed to represent the side information, and data efficiency is given by $$\varepsilon = 1 - \frac{\log_2 K}{N \cdot \log_2(Q)} \quad (11)$$

The simulation results with K=256, M=32, N=128 are given in FIG. 6. From this figure, it is clear that with 256 random permutations, the $10^{-4}$ PAPR can also be reduced by about 5 dB. Compared with the successive approach with the same number of permutations (M=32, S=1 and M=16, S=1) these two schemes present different performance. The slope of CCDF in the RS-CSRI scheme is much steeper than in the SS-CSRI scheme, which means that RS-CSRI scheme can achieve better performance for larger PAPR. For comparison, with randomly choosing phase weighting factors, the performance of suboptimal PTS scheme is also added, which shows that the former can still achieve slightly better performance than the latter.

Again since all permutations are randomly chosen, there is no way to know when the best sequence will take place until all K permutations are made. Therefore threshold control method is used to further reduce the complexity. Recalling from [Mizhou op.cit.], that the OFDM sequences with large PAPR are generally rare, the overall complexity can be reduced if only the sequences with large PAPR values (above certain threshold) are processed. With a properly selected threshold $PAPR_T$, after performing the $i^{th}$ permutation, the $PAPR_i$ is calculated and compared with the threshold $PAPR_T$, if $PAPR_i \leq PAPR_T$, the search will be stopped and the $i^{th}$ sequence is selected for transmission, otherwise the $(i+1)^{th}$ sequences will be produced. The process will be continued until the aforementioned condition is satisfied. If no sequence meets the condition, the one with the smallest PAPR is selected for transmission.

It is obvious that with a small $PAPR_T$, RS-CSRI scheme will be forced to search most of the permutations, while if $PAPR_T$ is large, RS-CSRI will search only a fraction of the K permutations. Therefore, the threshold control methods trades PAPR reduction for complexity. The CCDFs of RS-CSRI scheme with different $PAPR_T$ is shown in FIG. 7. From this figure, it is clear that with small value of threshold such as $PAPR_T=6$, RS-CSRI scheme can achieve almost the same performance as the one without threshold control, however, with reduced number of comparisons. With large value of threshold such as $PAPR_T=10$, the $10^{-2}$ PAPR reduction is less that 0.5 dB.

In the reference [Ochiai op. cit.], a close form approximation of PAPR distribution was derived as $$f_P(\lambda) = Pr(PAPR < \lambda) = \begin{cases} \left(1 - \frac{\sqrt{\lambda}\, e^{-\lambda}}{\sqrt{\bar{\lambda}}\, e^{-\bar{\lambda}}}\right)^{\sqrt{\frac{\pi}{3}} N \sqrt{\lambda}\, e^{-\lambda}} & \sqrt{\lambda} > \sqrt{\bar{\lambda}} \\ 0 & \sqrt{\lambda} < \sqrt{\bar{\lambda}} \end{cases} \quad (12)$$

where $\lambda = \pi$. If assuming all K scrambled sequences are uncorrelated, the CCDF of PAPR of the scrambled OFDM signals can then be expressed as $$Pr(K,\lambda) = Pr(PAPR > \lambda) = (1 - f_p(\lambda))^K \quad (13)$$

Therefore, the average number of comparisons C needed to achieve the PAPR less than $PAPR_T$ can be calculated as $$C = \sum_{k=2}^{K} k \left\{ \left[ \prod_{i=1}^{k-1} Pr(i, PAPR_T) \right] [1 - Pr(k, PAPR_T)] \right\} + K \prod_{i=1}^{K} Pr(i, PAPR_T) + 1 - Pr(1, PAPR_T) \quad (14)$$

The average number of comparisons needed versus selected $PAPR_T$ is shown in FIG. 8. The results from this theoretical approximation matches the simulation results quite well when $PAPR_T > 7.5$. Simulation results in FIG. 8 show that with $PAPR_T=6$, RS-CSRI achieves almost the same performance as without threshold control (see FIG. 7) and an average number of 207 comparisons is needed, thus, the complexity is reduced about 20%. With $PAPR_T=7.5$, the average number of permutations needed reduced to 3.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A signal scrambling method for peak-to-average power ratio (PAPR) reduction of OFDM signals, comprising: dividing an OFDM sequence of N symbols in said signal into M sub-blocks and performing combined symbol rotation and phase inversion in each sub-block to generate 2N/M blocks for each original sub-block and a set of at most $(2N/M)^M$ different OFDM sequences from the original OFDM sequence; and selecting from the resulting said set of OFDM sequences the one with the smallest PAPR for transmission.

2. A method in accordance with claim 1, in which said combined symbol and phase rotation is carried out at the first of the said sub-blocks to generate 2N/M sequences from said first sub-block from which the one with the smallest PAPR is selected and retained; and successively performing the same procedure for successive of said sub-blocks whereby the number of permutations considered is reduced, the PAPR is gradually reduced, and wherein the final resulting sequence is selected for transmission.

3. A method in accordance with claim 2, in which the number of permutations that must be considered is further reduced by identifying symbol groups in each said sub-block and performing the said rotation based on such groups.

4. A method in accordance with claim 1 in which a dimension K×M matrix with random numbers is produced, where K is the total number of permutations; each item in the matrix being an integer random number uniformly distributed over [1, 2N/M.S] representing 2N/M.S predefined different permutation operations carried out on said M sub-blocks, and S is the symbol grouping level denoting the number of symbols in each identified group, and producing K different said sequences; and selecting the sequence with the smallest PAPR for transmission; whereby in addition to said PAPR reduction the side information required for descrambling the signal is significantly reduced.

5. A method in accordance with claim 4, in which the complexity arising from the number of permutations is further reduced by performing threshold control.

* * * * *